(12) United States Patent
Van Haendel et al.

(10) Patent No.: US 11,511,487 B2
(45) Date of Patent: Nov. 29, 2022

(54) SYSTEM FOR PRODUCING AN OBJECT BY MEANS OF ADDITIVE MANUFACTURING

(71) Applicant: ADDITIVE INDUSTRIES B.V. [NL/NL], Eindhoven (NL)

(72) Inventors: Rob Peter Albert Van Haendel, Eindhoven (NL); Mark Herman Else Vaes, Eindhoven (NL)

(73) Assignee: ADDITIVE INDUSTRIES B.V., Eindhoven (NL)

( * ) Notice: Subject to any disclaimer, the term of this patent is extended or adjusted under 35 U.S.C. 154(b) by 636 days.

(21) Appl. No.: 16/462,740

(22) PCT Filed: Nov. 10, 2017

(86) PCT No.: PCT/NL2017/050727
§ 371 (c)(1),
(2) Date: May 21, 2019

(87) PCT Pub. No.: WO2018/097708
PCT Pub. Date: May 31, 2018

(65) Prior Publication Data
US 2019/0375152 A1 Dec. 12, 2019

(30) Foreign Application Priority Data
Nov. 24, 2016 (NL) ..................................... 2017864

(51) Int. Cl.
*B29C 64/321* (2017.01)
*B33Y 40/00* (2020.01)
(Continued)

(52) U.S. Cl.
CPC ............ *B29C 64/20* (2017.08); *B29C 64/153* (2017.08); *B29C 64/321* (2017.08); *B33Y 40/00* (2014.12);
(Continued)

(58) Field of Classification Search
CPC ...... B29C 64/20; B29C 64/153; B29C 64/321; B29C 64/357; B33Y 30/00; B33Y 40/00; B22F 12/00
See application file for complete search history.

(56) References Cited

U.S. PATENT DOCUMENTS

| 2008/0041487 A1* | 2/2008 | Cox | ................. B33Y 40/00 141/67 |
| 2014/0265049 A1* | 9/2014 | Burris | ............... B29C 64/277 264/497 |

(Continued)

FOREIGN PATENT DOCUMENTS

| DE | 10 2011 088 158 A1 | 6/2013 | |
| DE | 102011088158 A1 * | 6/2013 | ........... B23K 26/702 |

(Continued)

OTHER PUBLICATIONS

International Search Report for International Application No. PCT/NL2017/050727 dated Mar. 2, 2018.

*Primary Examiner* — Jerzi H Moreno Hernandez
(74) *Attorney, Agent, or Firm* — Suiter Swantz pc llo

(57) ABSTRACT

A system for producing an object by means of additive manufacturing including an apparatus, having a storage container for storing powdered material that can be solidified, and a process chamber fluidly connected to the storage container and arranged for receiving at least a part of the powdered material for forming a bath of material within the process chamber. Furthermore, a structure is provided for positioning the object in relation to the surface level of the bath of material. The apparatus also includes a solidifying device for solidifying a layer of the bath of material. A supply device is provided, having a supply container for storing a supply of powdered material that can be solidified, wherein the supply device is fluidly connected, or at least connectable, to the storage container, and wherein the appa- (Continued)

ratus is arranged for transferring powdered material between the supply container and the storage container.

11 Claims, 5 Drawing Sheets

(51) Int. Cl.
  *B29C 64/153* (2017.01)
  *B29C 64/20* (2017.01)
  *B29C 64/357* (2017.01)
  *B33Y 10/00* (2015.01)
  *B22F 12/00* (2021.01)

(52) U.S. Cl.
  CPC ............ *B22F 12/00* (2021.01); *B29C 64/357* (2017.08); *B33Y 10/00* (2014.12)

(56) References Cited

U.S. PATENT DOCUMENTS

| 2017/0259337 A1* | 9/2017 | Furukawa ............... B22F 10/20 |
| 2018/0339466 A1* | 11/2018 | El Naga ................. B33Y 40/00 |
| 2019/0105835 A1* | 4/2019 | Chanclon Fernandez ................... B29C 64/255 |
| 2019/0126346 A1* | 5/2019 | Graichen ................ B22F 3/003 |
| 2021/0205928 A1* | 7/2021 | Beeby ................... B29C 64/153 |

FOREIGN PATENT DOCUMENTS

| EP | 3 023 227 A1 | 5/2016 |
| JP | 2006312309 A | 11/2006 |
| WO | 9534468 A1 | 12/1995 |
| WO | 2014/144630 A1 | 9/2014 |
| WO | 2016/085334 A2 | 6/2016 |

* cited by examiner

SYSTEM FOR PRODUCING AN OBJECT BY MEANS OF ADDITIVE MANUFACTURING

TECHNICAL FIELD AND BACKGROUND

The present invention relates to a system for producing an object by means of additive manufacturing, comprising a process chamber for receiving a bath of material which can be solidified; a structure for positioning the object in relation to the surface level of the bath of material; a solidifying device for solidifying at least a part of a layer of the material on the surface.

3D printing or additive manufacturing refers to any of various processes for printing a three-dimensional object. Traditional techniques like injection molding can be less expensive for manufacturing, for example, polymer products in high quantities, but 3D printing or additive manufacturing can be faster, more flexible and less expensive when producing relatively small quantities of three-dimensional objects.

It is anticipated that additive manufacturing becomes more and more important in the future, as the increasing competitive pressure forces companies to not only manufacture more economically with a constant high product quality but also to save time and costs in the area of product development. The life span of products is continuously shortened. In addition to product quality and product costs, the moment of market introduction is becoming increasingly important for the success of a product.

The three-dimensional object may be produced by using a directed energy beam to selectively sinter a powder, or liquid material to produce a three-dimensional, 3D, object. In particular, a computer controlled additive manufacturing system may be used which sequentially sinters a plurality of layers to build the desired object in a layer-by-layer fashion. Primarily additive processes are used, in which successive layers of material are laid down under computer control. These objects can be of almost any shape or geometry, and are produced from a 3D model or other electronic data source.

In order to print a three-dimensional object, a printable model is to be created with a computer design package or via a 3D scanner, for example. Usually, the input is a 3D CAD file such as an STL file, a STEP file or a IGS file. Before printing the object from a CAD file, the file is to be processed by a piece of software called a slicer, which converts the model into a series of thin subsequent layers. Further, system settings and vectors are generated for controlling the creation of each of the subsequent layers.

A laser comprised in the computer controlled additive manufacturing system follows these settings and vectors to lay down successive layers of liquid, powder, paper or sheet material to build the 3D object from a series of cross sections. These layers, which correspond to the virtual cross sections from the CAD model, are then joined or fused to create the final 3D object.

To reduce operational costs of the system, it is an object to fully utilize the capacity of the system and, at the same time, make sure that the total production lead time of a three dimensional object is minimized, i.e. the production queue is minimized.

One of the challenges in the manufacturing of three dimensional objects, in particular in additive manufacturing of metal objects, is related to managing the quality of the layer to be solidified. The quality of the material to be solidified is of vital importance for obtaining desired product characteristics.

BRIEF SUMMARY

It is therefore an object of the invention to provide a system for producing an object by means of additive manufacturing, with which improved speed and accuracy of manufacturing may be obtained, in particular whilst at least maintaining or even increasing the quality of the material to be solidified.

To this end, the invention provides a system according to claim 1. The system according to the invention comprises an apparatus with a storage container for storing powdered material that can be solidified; with a process chamber fluidly connected to the storage container and arranged for receiving at least a part of the powdered material, preferably from said storage container, for forming a bath of material within the process chamber; with a structure for positioning the object in relation to the surface level of the bath of material; and with a solidifying device for solidifying at least a part of a layer of the bath of material.

According to the invention, said system further comprises a supply device having a supply container for storing a supply of powdered material that can be solidified. Connection means are provided that fluidly connect, or are arranged for fluidly connecting, the supply device to the apparatus, preferably for fluidly connecting the supply container to the storage container. Additionally, transfer means are provided for transferring powdered material between the supply container and the apparatus, preferably for transferring powdered material between the supply container and the storage container.

By using said system with a supply device for transferring powdered material from the supply container to the apparatus, preferably to the storage container, it becomes possible to quickly refill the storage container with a new supply of powdered material, for example. In addition, a high quality standard of the refilled supply may be ensured. In an embodiment, the supply container may be prefilled during use of the apparatus, and the system may be used to refill the storage container in an idle condition of the solidifying device. This not only ensures that a high quality supply may be provided in the supply container, but also means that the speed of manufacturing may be increased as the transfer of material from the supply container to the storage container may be performed relatively quickly. In an alternative embodiment, the apparatus may be provided with a new powder supply even during use of the apparatus, e.g. when using the apparatus for solidifying at least part of the layer of the bath of material. This decreases the idle time of the apparatus, and hence the productivity of the apparatus. Another advantage of using the supply device is that powdered material may be transferred from the apparatus back to the supply container. This way it is possible to remove a certain batch of powdered material from the apparatus, for example when it is detected that the quality of the powdered material does not reach a certain standard, or when a different material is needed for a next product.

A further advantage of the supply device is that powder already present in the storage container may be mixed with a powder supply present in the supply container. In principle, this will be most easily be performed by extracting the powder from the storage container, and mixing with the powder supply in the supply container. After mixing, the mixed power may be supplied to the storage container. This mixing averages the quality of both powders, which counteracts the aging effect that naturally occurs when powdered material resides in the storage container. Thus, the supply device allows the quality of the used powdered material to be increased.

Thus, from the above it follows that with the supply device according to the invention, the speed and accuracy of manufacturing, as well as the quality of the material to be solidified may be increased. With this, the object of the invention is achieved.

Advantageous embodiments will be described below.

In an embodiment, the system comprises flushing means for flushing the connection means, in particular with an inert gas such as argon or nitrogen. This increases the quality of the powder supply, as oxygen uptake by the powder will be prevented. Additionally, this increases the safety of the system, as the risk of explosion is dramatically reduced when oxygen is replaced by inert gases.

The supply device may be fluidly connected, or at least connectable, to the storage container for supplying powdered material to the storage container, to be used for providing a layer of powdered material to the process chamber.

It is beneficial if the storage container is arranged as an integral part of the apparatus. Within the context of the present disclosure an integral part is to be understood as a part that is designed as a part that remains inside the apparatus during a relative long period as opposed to consumable parts that are designed to be exchanged on a regular basis such as a build plate.

The use of the supply device according to the invention allows a safe and controlled transfer of powdered material, in particular when, in a connected state of the supply device, the supply container and the process chamber are sealed from the environment. This means that in a connected state, a closed system for transferring powdered material from the supply device to the apparatus, and vice versa, is established. Powdered material is prevented from leaving this closed system.

In an embodiment, the apparatus comprises an extraction device fluidly connected to the process chamber and arranged for extracting material out of the process chamber. With this, powdered material that remains in the process chamber after having solidified a layer of material, may be removed from the process chamber.

The extraction device may further be fluidly connected, or at least connectable, to the supply device for transferring the extracted material to the supply device. This allows the powdered material to be directly transferred from the apparatus to the supply device.

To enable an effective powder extraction, the apparatus comprises in an embodiment blowing means arranged for inducing a gaseous flow in the process chamber affecting the material to be extracted.

In a preferred embodiment, the supply device is arranged to be releasably connectable to the storage container. This allows the supply device to be filled and/or emptied off site, i.e. at a location remote from the apparatus, where quality standards and/or conditions may be optimized.

Transfer of material between the supply container and the storage container may be effected in an effective manner when the system comprises pneumatic transfer means for transferring the powdered material between the supply container and the storage container. As stated before, transferring may be from the supply container to the apparatus, for instance to the storage container, or from the apparatus (e.g. storage container) to the supply container, or vice versa, for instance due to the fact that a closed loop is formed between the apparatus and the supply container.

In a cost effective embodiment, the pneumatic transfer means comprise at least a pump and fluid lines for connecting the storage container to the supply container. The pump may be provided in the apparatus itself, for instance in a frame unit thereof. Alternatively, the releasable supply device may comprise the pump, for forming an autonomous supply device.

It is advantageous when the system comprises a filter unit for filtering powdered material that is being transferred between the supply container and the apparatus. This further enhances the quality of the powdered material.

In an effective embodiment, the filter unit comprises a cyclone filter. The filter unit, such as the cyclone filter, may be provided on the supply device. This way maintenance of the filter unit is relatively easy.

According to an aspect, the invention provides a method of supplying powdered material to an apparatus for producing an object by means of additive manufacturing. The method comprises the step of providing an apparatus having a storage container for storing powdered material that can be solidified; a process chamber fluidly connected to the storage container and arranged for receiving at least a part of the powdered material, preferably from the storage container, for forming a bath of material within the process chamber; a structure for positioning the object in relation to the surface level of the bath of material; and a solidifying device for solidifying at least a part of a layer of the bath of material.

According to the invention, the method comprises the steps of providing a supply device having a supply container for storing a supply of powdered material that can be solidified. The method further comprises the step of connecting, by means of connecting means, in particular by means of mutually engaging connecting elements that are provided on the apparatus and the supply device, said supply device to the apparatus, preferably the storage container, and transferring powdered material between the supply container and the apparatus, preferably the storage container. Advantages of such a method have already been described in the foregoing.

In an embodiment, said method comprises the step of flushing the connection means, in particular with an inert gas such as argon or nitrogen. In particular this step is performed before any transferring of powder takes place.

In an embodiment, the method comprises the step of mixing powdered material in the storage container with powdered material in the supply container. By mixing, the quality of the powdered material in the storage container may be increased. Mixing may take place in the supply container. Hence, powdered material may be extracted from the storage container, be transferred to the supply container, and there be mixed with powdered material already present in the supply container. Afterwards, powdered material may be transferred back to the storage container.

In an embodiment, the method comprises the step of supplying powdered material to the storage container during use of the solidifying device. This decreases the productivity of the apparatus, as the apparatus does not need to be idle for transferring powdered material to the apparatus. Additionally, or alternatively, the method may comprise the step of supplying powdered material to the storage container during non-use of the solidifying device.

BRIEF DESCRIPTION OF THE DRAWINGS

Embodiments of the invention will be described in the following in connection with the Figures. In the Figures.

DETAILED DESCRIPTION

Figure 1:
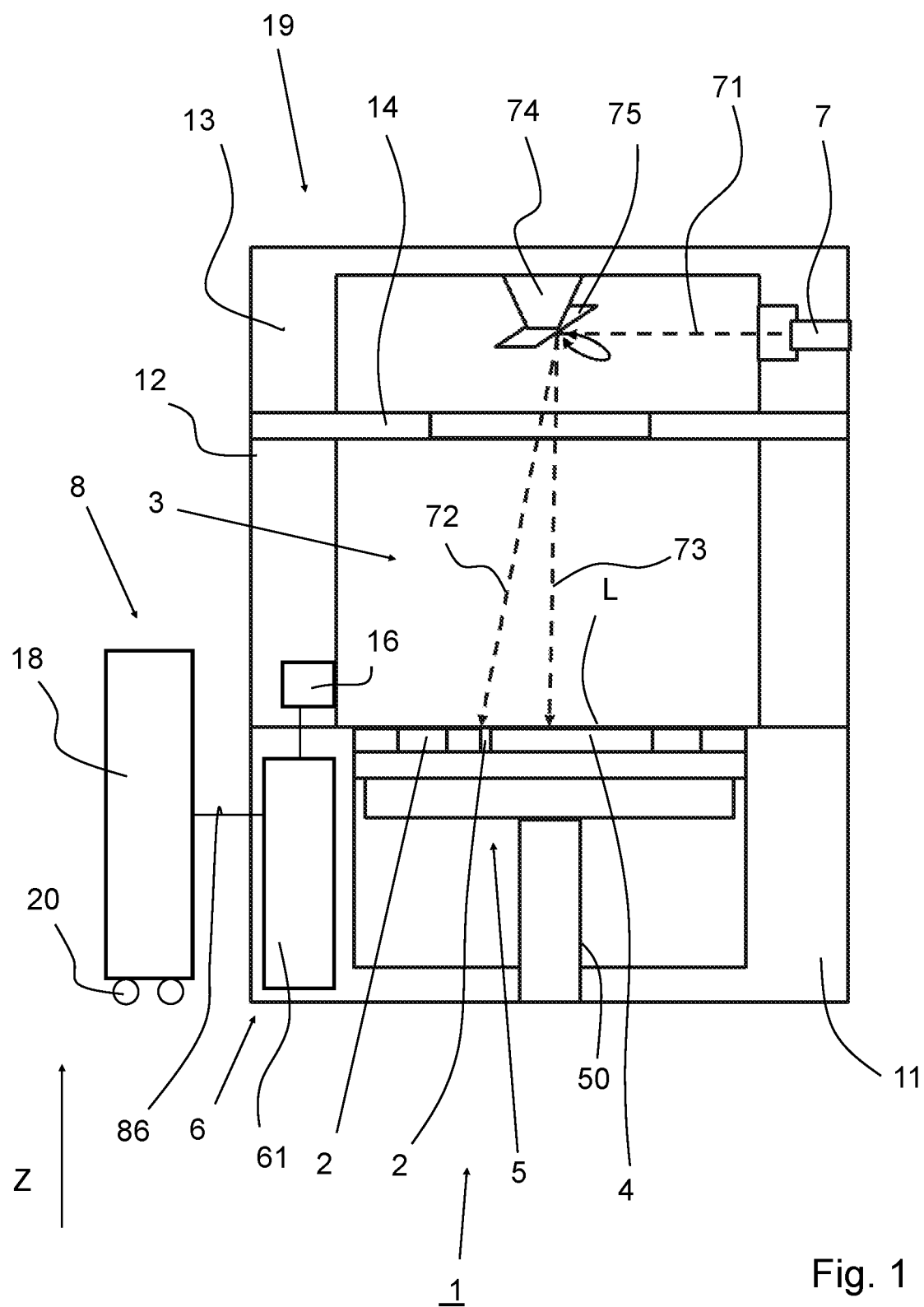
FIG. 1 shows a schematic overview of a first embodiment of a system according to the present invention for additive manufacturing an object.

FIG. 1 shows an overview of a system 1 for producing an object 2 by means of additive manufacturing. The system comprises an apparatus 19 that is built from several frame parts 11, 12, 13, 14. The apparatus 19 comprises a process chamber 3 for receiving a bath of material 4 which can be solidified. In a lower frame part 11, a shaft 50 is formed, wherein a support 5 is provided for positioning the object 2 in relation to the surface level L of the bath of material 4. The support 5 is movably provided in the shaft 50, such that after solidifying at least a part of a layer, the support 5 may be lowered, and a further layer of material may be solidified on top of the part of the object 2 already formed. In a top part 13 of the apparatus 19, a solidifying device 7 is provided for solidifying a selective part of the material. In the embodiment shown, the solidifying device 7 is a laser device, which is arranged for producing electromagnetic radiation in the form of laser light, in order to melt a powdered material provided on the support, which then, after cooling forms a solidified part of the object 2 to be produced. However, the invention is not limited to the type of solidifying device 7. As can be seen, the electromagnetic radiation 71 emitted by the laser device 7 is deflected by means of a deflector unit 74, which uses a rotatable optical element 75 to direct the emitted radiation 71 towards the surface L of the layer of material 4. Depending on the position of the deflector unit 74, radiation may be emitted, as an example, according to rays 72, 73.

On the left hand side of FIG. 1, powder supply means 6 are provided. These powder supply means 6 comprise a storage container 61 for storing powdered material that can be solidified. This storage container 61 is fluidly connected, via a powder supply means 16, such as a nozzle or a (rotary) valve, to the process chamber 3. Connected to the storage container 61 is a supply device 8. This movable supply device 8 has a supply container 18 for storing a supply of powdered material that can be solidified. As can be seen, the supply device 8 is fluidly connected to the storage container by means of line 86. The system 1 according to the invention is arranged for transferring powdered material between the supply container 18 and the apparatus 19, and in particular between the supply container 18 and the storage container 61. This may mean that the transfer takes place from the supply container 18 to the storage container 61, and/or from the storage container 61 to the supply container 18. Transfer means, such as fluid lines and one or more pumps, may be provided to this end. In the embodiment shown in FIG. 1, the supply device 8 is releasably connectable to the storage container 61. Suitable connecting means may be provided to this end, with which the supply device 8 may be connected and/or reconnected to the storage container 61. The supply device 8 is movable due to the fact that a number of wheel elements 20 are provided.

With the supply device according to the invention, it is relatively easy to refill the storage container 61, or to empty it if needed. Filling and/or emptying may be done relatively quickly, and may even be performed when the solidifying device 7 of the apparatus 19 is active. Filling of the supply device 8 may for instance be performed at a location distant from the apparatus 19, and may thus be performed under specific and controlled conditions, ensuring that the quality of the powdered material reaches a predetermined standard. The subsequent filling may then be performed relatively quickly.

In an embodiment, the supply device 8 is provided next to the apparatus 19, and connected by means of the connecting means 86 to the apparatus. Once said supply device 8 is connected to the apparatus 19, powdered material may be transferred between the supply container 18 and the apparatus 19.

Additionally flushing means may be provided for flushing the connection means, in particular with an inert gas such as argon or nitrogen. A gas supply 117 (see FIG. 5) may be present in the device 8 for flushing the connection means and conduits. Alternatively, the gas supply may be present in the apparatus 19 itself (see FIGS. 3 and 4). Thus, the connection means may be flushed, in particular with an inert aas such as argon or nitrogen. In any event, the use of an inert gas for flushing the lines and conduits increases the quality of the powder supply, as oxygen uptake by the powder will be prevented. Additionally, this increases the safety of the system, as the risk of explosion is dramatically reduced when oxygen is replaced by inert gases.

Also, it will be possible to increase the quality of the powdered material in the storage container 61 when the step is performed of mixing powdered material in the storage container 61 with powdered material in the supply container 18. To this end, the powdered material in the storage container 61 may be extracted to the supply container 18, where mixing takes place, whereafter the mixed powder may be transferred back to the storage container 61.

As already stated, the use of the storage device 8 according to the invention allows the step of supplying powdered material to the storage container 61 to be performed during use of the solidifying device 7.

Figure 2:
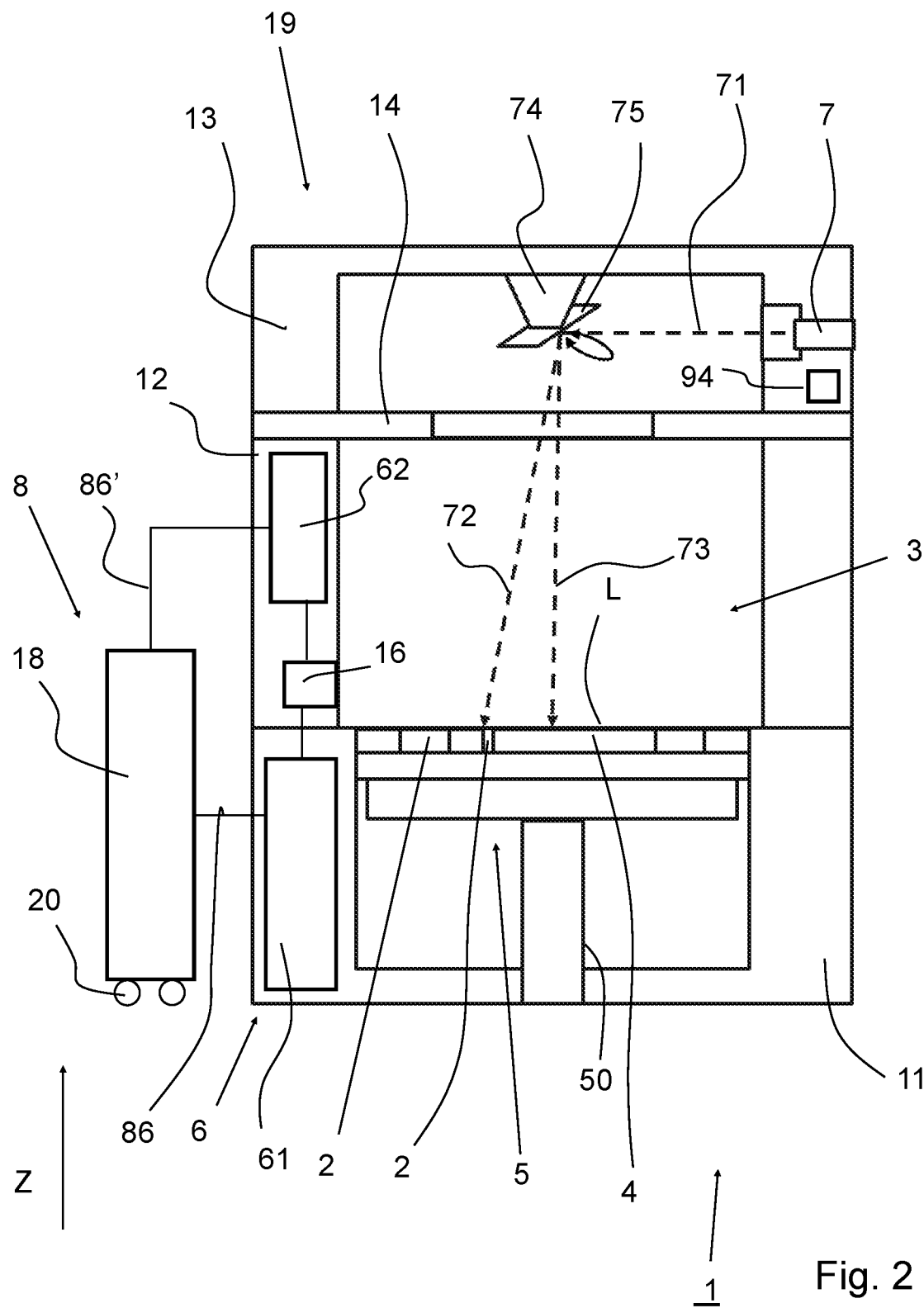
FIG. 2 shows a schematic overview of a second embodiment of the system according to the present invention.

FIG. 2 shows a further embodiment of the system 1 with the apparatus 19 according to the invention. In this embodiment two storage containers 61, 62 are provided. Both storage containers 61, 62 are connected to the powder supply nozzle 16. Powder from both containers 61, 62 may thus be provided to the process chamber 3. The supply device 8 is connected, via lines 86 and 86', to both storage containers 61, 62. Powder may be supplied to both containers 61, 62, or may be extracted from both containers 61, 62. Alternatively, powder may be supplied to the top most container 62, and may be extracted from the bottom container 61.

Figure 3:
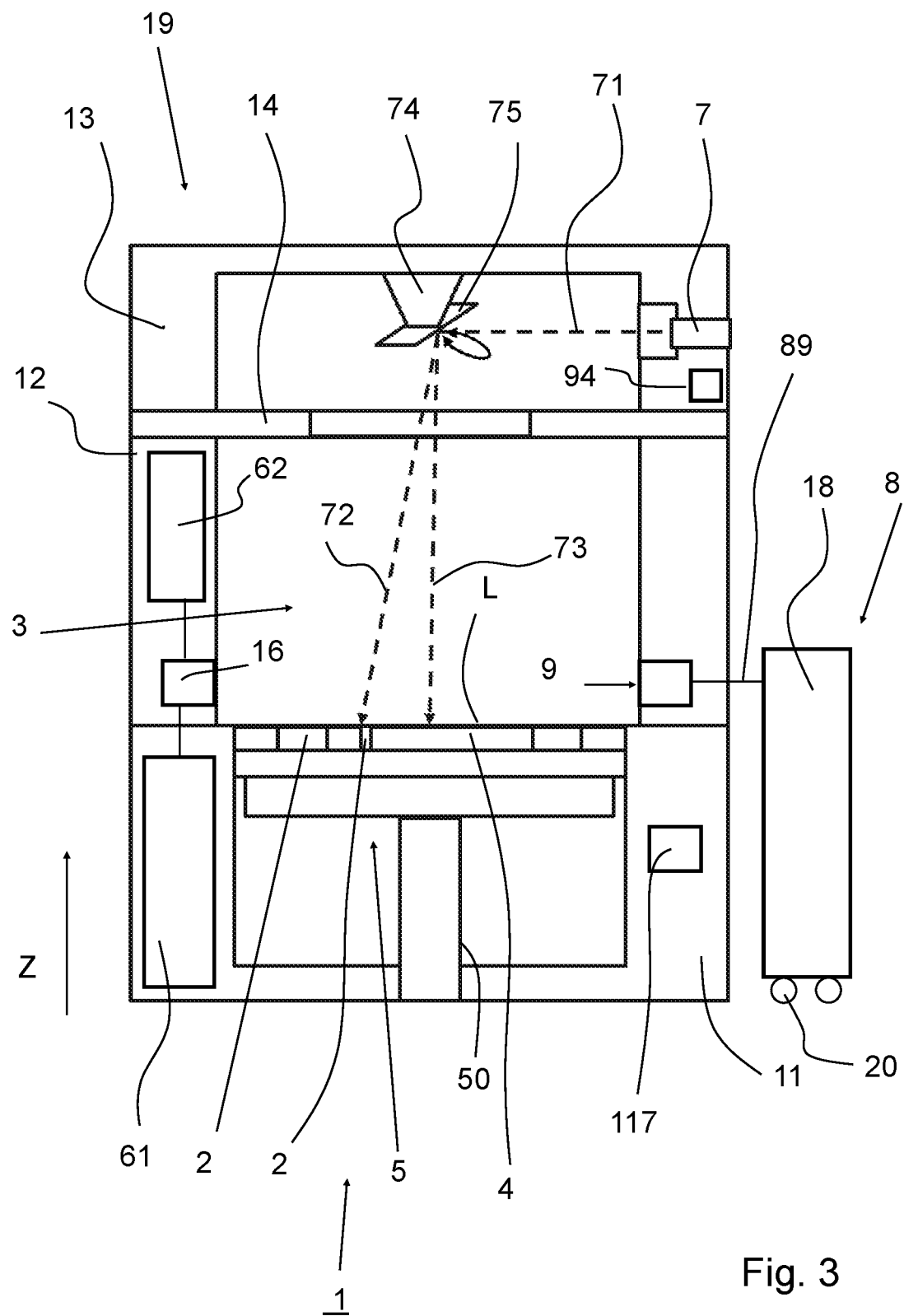
FIG. 3 shows a schematic overview of a third embodiment of the system according to the present invention.

FIG. 3 shows a further embodiment of the system 1 according to the invention. In this embodiment, the apparatus 19 shown further comprises an extraction device 9 fluidly connected to the process chamber 3 and arranged for extracting material 4 out of the process chamber. The extraction device 9 may be a pump. The supply device 8 is fluidly connected to the extraction device 9, and thus to the process chamber 3, by means of extraction line 89. Thus, when the extraction device 9 is activated, excess powder from the process chamber 3 may be transferred to the supply device 8 for further use.

Figure 4:
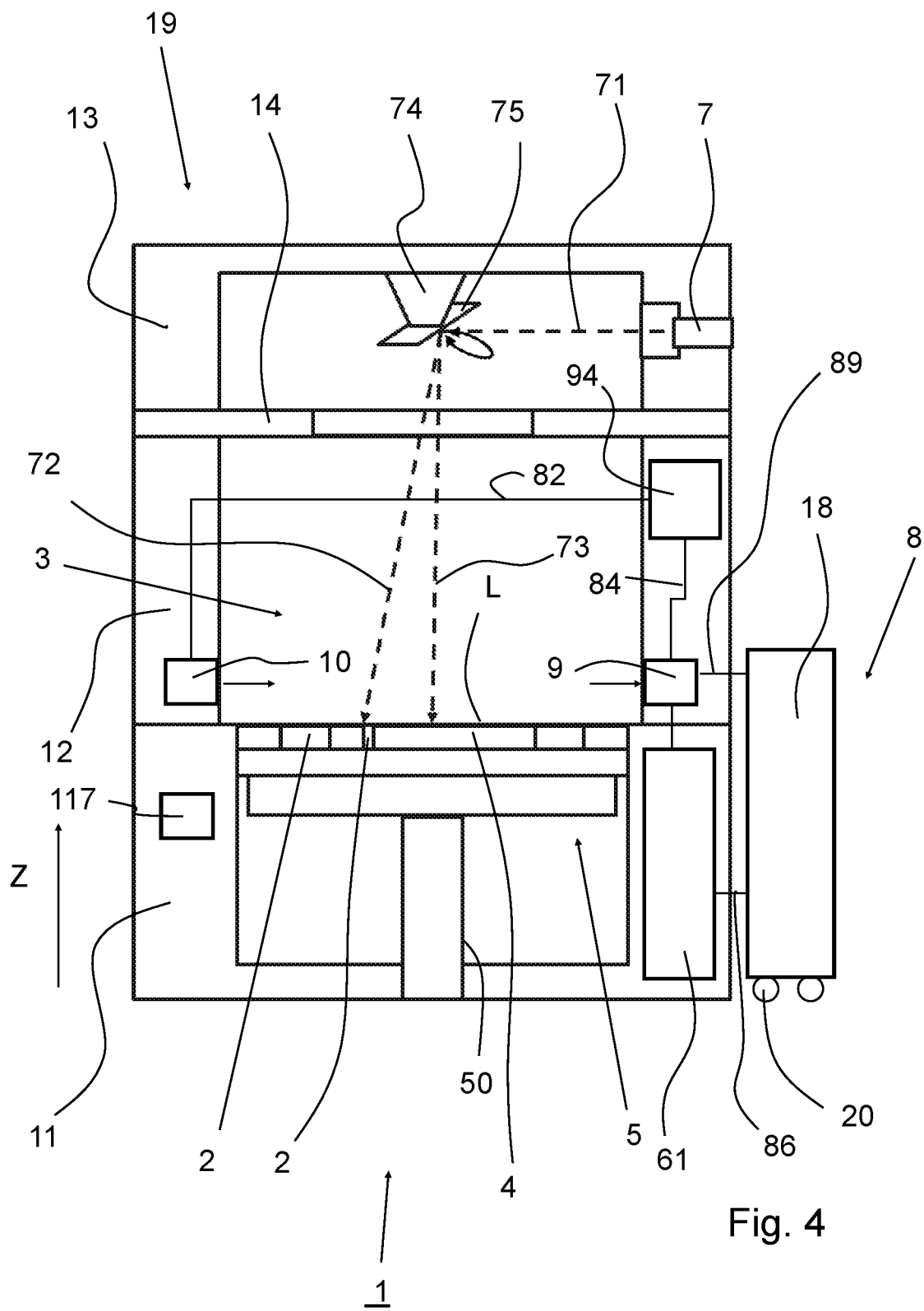
FIG. 4 shows a schematic overview of a fourth embodiment of the system according to the present invention.

FIG. 4 shows a further embodiment of the system 1 according to the invention. This embodiment is similar to the embodiment of FIG. 3, with the following additions. Here, the apparatus 19 is provided with blowing means 10 on the opposite side of the process chamber 3 for inducing a gaseous flow in the process chamber 3 effecting the material to be extracted. Further blowing means may be provided as well, for more effectively influencing the powdered material in the process chamber 3. The blow nozzle 10 is connected via lines 82 to a control unit 94. The extraction device 9 is connected via line 84 to the control unit 94. The control unit 94 may be used to start and/or stop the blowing nozzle 10 (or nozzles). The extraction device 9, for instance in the form of a suction device 9, is also connected to this control unit 94, such that operation thereof may be synchronized. It is, however, conceivable that the extraction device 9 is provided with a separate control unit.

FIG. 4 further shows that the extraction device 9 is connected to the supply device 8 by means of extraction line 89. A storage container 61 is provided in the lower frame part 11 of the apparatus 19, and is also connected to the extraction device 9. The storage container 61 is also connected to the supply device 8. The storage container 61 is fluidly connected to the process chamber 3, such that a layer of material may be deposited in the process chamber 3. Details of this fluid connection are not shown in FIG. 4, but these details have already been described with reference to FIG. 1.

Figure 5:
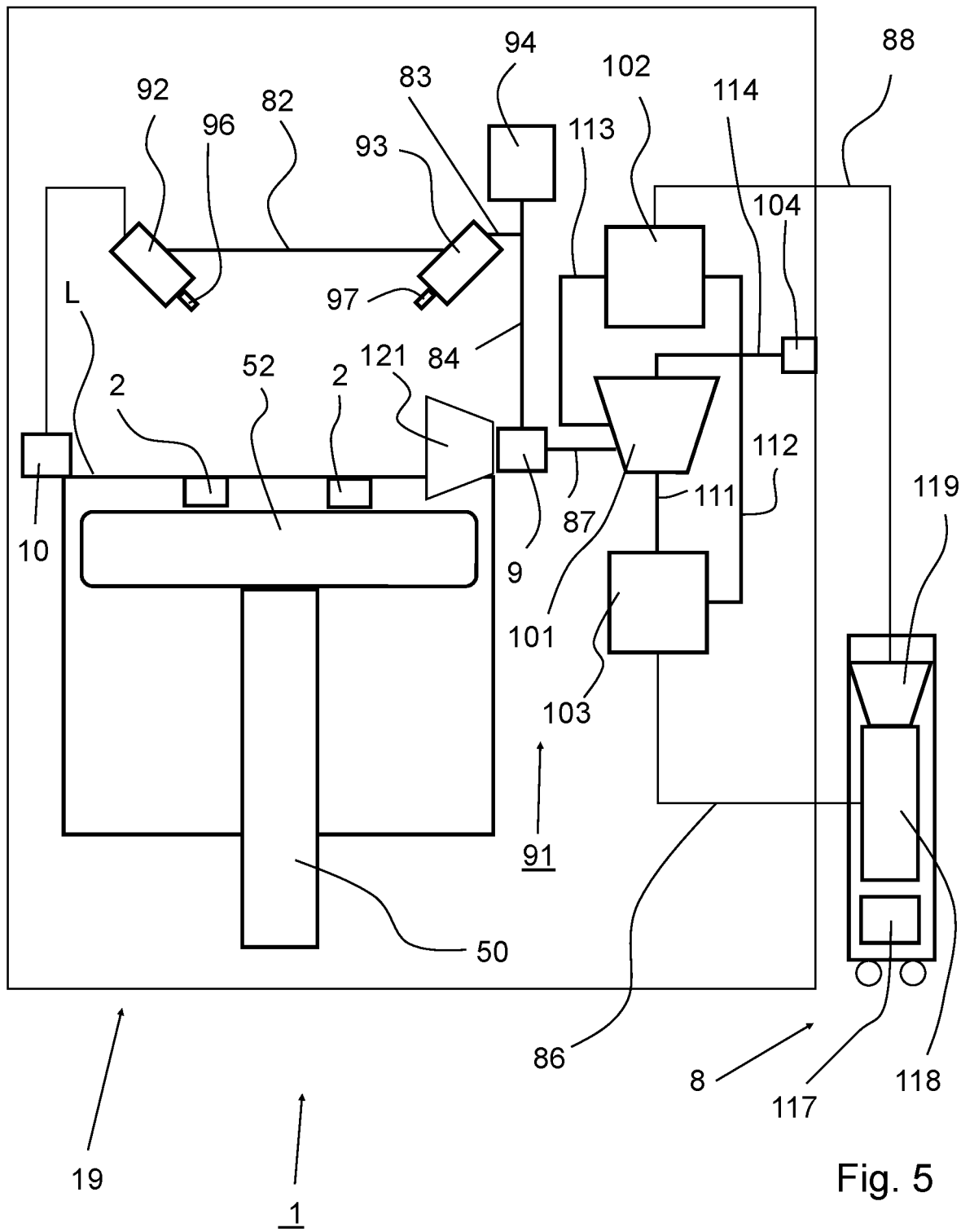
FIG. 5 shows a detailed overview of a fifth embodiment of the system according to the invention.

FIG. 5 shows a further embodiment of the system 1 according to the invention, having two additional nozzles 92, 93, which may be movable nozzles 92, 93, and in which in particular details of the apparatus 19 downstream of the extraction device 9 are shown. The extraction device 9 comprises an extraction tube 121 comprising a pumping unit (shown as one unit 121), wherein an inlet opening of the extraction tube 121 is positioned within the process chamber 3. Furthermore, the extraction device 9 is fluidly connected, via line 87, to a filter unit 101, in particular a cyclone filter unit 101, which may be used to filter the extracted gaseous flow containing the material extracted from the process chamber. For instance, this allows powdered material contained in the flow to be filtered and collected for further usage. The cyclone filter unit 101 is connected, via line 111, to a first storage container 103 or collector, for collecting powdered material filtered by the filter unit 101. The gaseous flow may, after having passed the filter unit 101, be exhausted from the apparatus 19 by means of exhaust tube 114 and exhaust outlet 104. In this way, the gaseous flow may be vented through the exhaust tube 114 and outlet 104. In a preferred embodiment, the exhaust tube 114 is connected to the blowing means 10, such that the filtered gas flow may once again be introduced into the process chamber.

The first storage container 103 is connected, via line 112, to a second storage container 102, provided above the first storage container 103. Material collected in the first storage container 103 may be transferred via line 112 to the second storage container 102, for later use. An overflow line 113 is provided between the second storage container 102 and the filter unit 101, which may be used to filter the extracted material a plurality of times, by re-feeding said material back to the filter unit a number of times, for instance.

Thus, the extraction device 9 may be connected to one or more storage container 103, 102 for holding material extracted from the process chamber. This material may be re-used, for instance for laying down a further layer of material to be solidified.

Furthermore, the system 1 comprises a supply device 8 that is connected to the first storage container 103 and the second storage container 102, via lines 86 and 88, respectively. The supply device 8 comprises a supply container 118, and a filter unit 119 provided upstream thereof. A pump unit (not shown) may be used to transfer powdered material from the supply device 118 to the first storage container 103. Additionally, or alternatively, powdered material may be extracted from the second storage container 102 to the supply container 118. The filter unit 119 may be used to further filter the powdered material coming from the second storage container 102.

It will be clear to those skilled in the art, that the invention is described above by means of several embodiments. However, the invention is not limited to these embodiments. Combinations of individual parts of the several embodiments are conceivable. The desired protection is defined by the appended claims.

The invention claimed is:

1. A system for producing an object by an additive manufacturing process, comprising:
   an apparatus comprising:
      a storage container configured to store powdered material;
      a process chamber fluidly coupled to the storage container, the process chamber configured to receive powdered material from the storage container to form a bath of powdered material within the process chamber;
      a structure configured to position the object relative to a surface level of the bath of powdered material;
      a radiation device configured to sinter at least a part of a layer of the bath of powdered material; and
      an extraction device fluidly coupled to the process chamber, the extraction device configured to extract powdered material from the process chamber;
   a supply device fluidly coupled to each of the storage container and the extraction device, the supply device including a supply container configured to store a new supply of powdered material to be supplied to the storage container, wherein the supply device is releaseably coupled to the apparatus; and
   a transfer device configured to transfer powdered material between the supply container and the storage container.

2. The system according to claim 1, further comprising a flushing device configured to flush a fluid coupling between the supply container and the storage container with an inert gas including at least one of argon or nitrogen.

3. The system according to claim 1, wherein the storage container is an integral part of the apparatus.

4. The system according to claim 1, wherein, in a fluidly coupled state of the of the supply device, the supply container and the process chamber are sealed from an external environment.

5. The system according to claim 1, wherein the extraction device includes a blower configured to induce a gaseous flow in the process chamber to facilitate extraction.

6. The system according to claim 1, wherein the transfer device is a pneumatic transfer device.

7. The system according to claim 6, wherein the pneumatic transfer device includes a pump and fluid lines fluidly coupling the supply container to the apparatus.

8. The system according to claim 7, wherein the pump is attached to or positioned within the supply device.

9. The system according to claim 1, further comprising a filter fluidly coupled between the supply container and the apparatus.

10. The system according to claim 9, wherein the filer is a cyclone filter.

11. The system according to claim 9, wherein the filter is positioned in the supply device.

\* \* \* \* \*